United States Patent
Zuniga

(10) Patent No.: US 7,869,413 B2
(45) Date of Patent: Jan. 11, 2011

(54) APPARATUS AND METHODS FOR CENTRAL CONTROL OF MESH NETWORKS

(75) Inventor: Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 113 days.

(21) Appl. No.: 12/336,842

(22) Filed: Dec. 17, 2008

(65) Prior Publication Data
US 2009/0092115 A1   Apr. 9, 2009

Related U.S. Application Data

(63) Continuation of application No. 10/975,647, filed on Oct. 28, 2004, now Pat. No. 7,468,969.

(60) Provisional application No. 60/518,214, filed on Nov. 7, 2003.

(51) Int. Cl.
| | |
|---|---|
| *H04W 4/00* | (2009.01) |
| *H04B 7/00* | (2006.01) |
| *H04L 12/28* | (2006.01) |
| *H04L 12/56* | (2006.01) |
| *H04W 36/00* | (2009.01) |

(52) U.S. Cl. .................. 370/338; 370/328; 370/401; 455/437; 455/41.2

(58) Field of Classification Search .................. 370/338, 370/328, 389, 401; 455/436, 437, 41.2, 41.3, 455/502
See application file for complete search history.

(56) References Cited

U.S. PATENT DOCUMENTS

| | | | |
|---|---|---|---|
| 4,644,532 A | 2/1987 | George et al. | |
| 4,825,206 A | 4/1989 | Brice et al. | |
| 5,138,615 A | 8/1992 | Lamport et al. | |
| 6,574,266 B1 | 6/2003 | Haartsen | |
| 6,590,928 B1 | 7/2003 | Haartsen | |
| 6,879,570 B1 | 4/2005 | Choi | |
| 7,246,045 B1 | 7/2007 | Rappaport et al. | |
| 7,304,968 B2 | 12/2007 | Dawidowsky et al. | |
| 2001/0002912 A1 | 6/2001 | Tony et al. | |
| 2003/0076799 A1 | 4/2003 | Kwak et al. | |
| 2003/0081603 A1 | 5/2003 | Rune | |
| 2003/0149794 A1 | 8/2003 | Morris et al. | |
| 2004/0253970 A1 | 12/2004 | Kunihiro | |

FOREIGN PATENT DOCUMENTS

JP        10-164073       6/1998

(Continued)

OTHER PUBLICATIONS

IEEE 802.11F, "Trial-Use Recommended Practice for Multi-Vendor Access Point Interoperability via an Inter-Access Point Protocol Across Distribution Systems Supporting IEEE 802.11 Operation", Jul. 2003.

IEEE Wireless LAN Edition, A Compilation Based On IEEE Std. 802.11, 1999 (R2003) and its Amendments.

(Continued)

*Primary Examiner*—Un C Cho
(74) *Attorney, Agent, or Firm*—Volpe and Koenig, P.C

(57) ABSTRACT

A method and a wireless communication device that implements a control node for a mesh network. Preferably, the device and method are used in an 802.11 LAN.

35 Claims, 2 Drawing Sheets

Controlling Node

FOREIGN PATENT DOCUMENTS

| | | |
|---|---|---|
| JP | 11-008585 | 1/1999 |
| JP | 2003-051771 | 2/2003 |
| JP | 2003-158766 | 5/2003 |
| WO | 01/01717 | 1/2001 |

OTHER PUBLICATIONS

Cidon I et al., "Control Mechanisms for High Speed Networks", International Conference on Communications. Including Supercomm Technical Sessions. Atlanta, Apr. 15-19, 1990, New York, IEEE, US vol. 2, Apr. 15, 1990, pp. 259-263, XP000146078.

APPARATUS AND METHODS FOR CENTRAL CONTROL OF MESH NETWORKS

CROSS REFERENCE TO RELATED APPLICATIONS

This application is a continuation of U.S. patent application Ser. No. 10/975,647, filed Oct. 28, 2004, now U.S. Pat. No. 7,468,969, issued Dec. 23, 2008, which claims the benefit of U.S. Provisional Application Ser. No. 60/518,214, filed Nov. 7, 2003, which is incorporated by reference as if fully set forth.

FIELD OF INVENTION

This application relates to wireless communications, and in particular the central control of mesh networks such as Wireless Local Area Networks (WLANs) that implement mesh networking, particularly those compliant with the standard known as 802.11.

BACKGROUND

Wireless communication systems are well known in the art. Generally, such systems comprise communication stations, which transmit and receive wireless communication signals between each other. Depending upon the type of system, communication stations typically are one of two types: base stations or wireless transmit/receive units (WTRUs), which include mobile units.

The term base station as used herein includes, but is not limited to, a base station, Node B, site controller, access point or other interfacing device in a wireless environment that provides WTRUs with wireless access to a network with which the base station is associated.

The term WTRU as used herein includes, but is not limited to, a user equipment, mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided where each base station is capable of conducting concurrent wireless communications with appropriately configured WTRUs. Some WTRUs are configured to conduct wireless communications directly between each other, i.e., without being relayed through a network via a base station. This is commonly called peer-to-peer wireless communications. WTRUs can be configured for use in multiple networks with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants (PDAs), consumer electronics (CEs), and laptop computers are being built with one or more WLAN modems.

An example of a wireless local area network environment with one or more WLAN access points (APs) is a WLAN built according to the IEEE 802.11 standard. Access to these networks usually requires user authentication procedures. Protocols for such systems continue to be standardized in the WLAN technology area. One such framework of protocols is the IEEE 802 family of standards. In addition to the WLAN 802.11 standard, these include, but are not limited to, the 802.15 WPAN (Wireless Personal Area Networks) implemented with, for example, Bluetooth devices, and 802.16 WMAN (Wireless Metropolitan Area Networks).

The basic service set (BSS) is the basic building block of an IEEE 802.11 LAN and is comprised of WTRUs referred to as stations (STAs). Basically, a set of STAs which can communicate with each other can form a BSS. Multiple BSSs are interconnected through an architectural component, called a distribution system (DS), to form an extended service set (ESS). An access point (AP) is a STA that provides access to the DS by providing DS services and generally allows concurrent access to the DS by multiple STAs.

There are two prevalent ways to implement wireless communications in WLAN and other networks: 1) an infrastructure mode; and 2) an ad hoc mode. FIG. 1A illustrates an infrastructure mode, where WTRUs conduct wireless communications via a base station 54 that serves as an access point to network infrastructure 16. The base station 54 is shown as conducting communications with WTRU 18, WTRU 20, WTRU 22, WTRU 24, and WTRU 26. There are no direct intercommunications between the WTRUs illustrated in FIG. 1A. The communications are coordinated and synchronized through the base station 54. Such a configuration is also called a basic service set (BSS) within WLAN contexts.

In contrast to the infrastructure mode, the ad hoc mode does not use network infrastructure. The ad hoc mode operates with peer-to-peer communications and is also called "independent BSS". In ad hoc mode, two or more WTRUs establish a communication among themselves without the need of a coordinating network element, i.e., base station. Ad hoc mode operation is illustrated in FIG. 1B. No access points to the network infrastructure are required. However, a base station can be configured with the ad hoc protocols to act as the other WTRUs in peer-to-peer communications. In such case, a base station may act as a bridge or a router to another network or to the Internet.

Where a base station does join an ad hoc network, it is treated as another WTRU and does not normally control the flow of communication. For example, FIG. 1B illustrates base station 54 in communication with WTRU 18 and WTRU 18 in communication with WTRU 20 in an ad hoc network. In this scenario, the base station 54 does not control the flow of data.

Communications are normally limited to the other stations in an ad hoc network, but one WTRU may communicate indirectly with another WTRU via a third WTRU serving as a relaying node. For example, as shown in FIG. 1B, where both WTRU 22 and WTRU 24 are communicating in ad hoc mode with WTRU 26, communications may occur between WTRU 22 and WTRU 24. Additionally, when a WTRU is in ad hoc mode, it typically ignores infrastructure mode base station transmissions. It is also necessary for one WTRU to initiate ad hoc mode and other WTRUs to join in. The other stations will assimilate the operating parameter information as they join the ad hoc network.

The station that starts an ad hoc network selects the ad hoc network's operating parameters, such as the service set identifier (SSID), channel and beacon timing, and then transmits this information in, for example, beacon frames. As stations join the ad hoc network, they assimilate the operating parameters. In infrastructure mode, parameters such as the SSID are normally specified by a network controller connected to network base stations.

The SSID in an IEEE 802 based system can be a 32-character unique identifier attached to a header of packets sent over a WLAN. The SSID differentiates logically one WLAN from another, so all base stations and all devices attempting to connect to a specific WLAN normally use the same SSID.

In an IEEE 802 based system, once more than one station is part of an ad hoc network, all of the stations share the burden of sending beacon frames by a random distribution of that task to each station. Algorithms such as the spokesman election algorithm have been designed to "elect" one device as a master station (i.e., pseudo base station) of the ad hoc network with all others being slaves.

When a plurality of ad hoc networking WTRUs communicate with each other a mesh network is created. Accordingly, mesh networks are a type of ad-hoc network where more than one WTRU communicates directly or indirectly with at least two other WTRUs in the mesh. From a strict IEEE 802.11 group point of view an Ad-hoc network allows WTRUs to communicate to whichever WTRU they want "directly" over the same shared medium, whereas the Mesh network allows WTRUs to communicate "directly or indirectly" over one or more media. That is, ad-hoc WTRUs can only talk to WTRUs within their radio reach, and mesh WTRUs can forward or relay information from two other different WTRUs allowing these other WTRUs to communicate with each other, even if they are not within each other's transmission range, if they are not in the same band, or if they do not use the same physical layer (e.g. 802.11a and 802.11b). This distinction is not limiting in the context of the disclosed embodiments.

The inventors have recognized that in communication systems, there are different ways to optimize operation performance through system reconfigurations. These reconfigurations are the outcome of decisions that are usually based on system status, predictions, etc. and follow the rules of certain procedures or algorithms. When information about the system cannot be centralized in a single point, distributed decisions or algorithms are the only way to overcome the problem. Due to the nature of mesh networks, distributed decisions are often used as a single solution. Although the decision could be sub-optimal, no other alternative can be taken.

SUMMARY

Communications using mesh network topologies, where nodes can communicate to each other without the need for a central point (e.g. a wireless Base Station [BS] or an Access Point [AP]), to relay the information, are disclosed. Apparatus and methods are disclosed for improving the performance of communication systems with mesh or semi-mesh topologies where none or distributed decisions exist, by relaying system information and taking reconfiguration decisions in a central point.

In one embodiment, a wireless transmit/receive unit (WTRU) is configured to conduct wireless communications with a plurality of WTRUs as nodes in a mesh type of network. The WTRU has a receiver component, a processor component and a transmitter component. The transmitter and receiver components may be configured as a single type of transceiver or as a combination of different types of transmitters and receivers configured for communication in multiple networks of different types.

The receiver component is preferably configured to receive mesh messages, including an Initiation message that has data reflecting the identity, if any, of a current control node. The processor component is preferably configured to generate mesh messages, including Initiation messages that include data reflecting the identity, if any, of a current mesh control node. The transmitter component is preferably configured to transmit generated messages including a generated Initiation message to WTRUs seeking to join the WTRU in mesh communications.

The processor component may be configured to include a status value and an initial weight value in each generated mesh message and to modify each mesh message received for retransmission that has associated status and weight values by averaging the WTRU's status value with the received message's status value based on the received message's weight value and incrementing the received message's weight value to produce revised status and weight values. The transmitter component is then configured to re-transmit mesh messages received from one WTRU to other WTRUs with which the WTRU is in mesh communication with the revised status and weight values.

Preferably, the processor component includes a processor configured to include a message identifier in each generated mesh message and an associated memory configured to track message identifiers included in received mesh messages. The transmitter component is then configured to re-transmit mesh messages received from one WTRU to other WTRUs with which the WTRU is in mesh communication when tracking reflects that the received message was not previously received.

Where the WTRU does not have mesh network control capabilities, the processor component is preferably configured to generate Initiation messages that reflect no current control node upon initiation of a mesh network with another WTRU or in response to receipt of an Initiation message that reflects no current control node until receipt of a message identifying a current control node. Where the WTRU has mesh network control capabilities, the processor component is preferably configured to generate a message establishing the WTRU itself as the current control node that includes data reflecting its own identity as the current mesh control node upon initiation of a mesh network with another WTRU or in response to receipt of an Initiation message that reflects no current control node.

Where the WTRU has mesh network control capabilities, the processor component is preferably further configured to generate a message directed to the current control node that includes data reflecting its own identity as a potential mesh control node in response to receipt of an Initiation message that reflects a current control node. The processor component is then preferably configured with a memory to track messages received identifying potential mesh control nodes when the WTRU is serving as the current control node and an associated processor configured to generate a message identifying a new control node from among the potential mesh control nodes identified in the tracked messages when the WTRU relinquishes service as the current control node.

In another embodiment, the WTRU's receiver component is configured to receive Initiation messages having data reflecting the identity, if any, of a current control node and a level of control capability of the current control node. The processor component is then preferably configured to generate Initiation messages that include data reflecting the identity, if any, of a current mesh control node and a level of control capability of the current control node. Where the WTRU has mesh network control capabilities of one of a hierarchy of control capability levels, the processor component is then configured to generate a message establishing the WTRU itself as the current control node that includes data reflecting its own identity and control capability level upon initiation of a mesh network with another WTRU or in response to receipt of an Initiation message that reflects no current control node.

Also, the processor component is then preferably configured to generate a message directed to the current control node that includes data reflecting its own identity and control capability level as a potential mesh control node in response to receipt of an Initiation message that reflects a current control node. In such case, the processor component is preferably configured to track messages received identifying potential mesh control nodes when the WTRU is serving as the current control node and to generate a message identifying the identity and control capability level of a new control node from among the potential mesh control nodes identified in the tracked messages when the WTRU relinquishes service as the current control node. The processor component may also be configured to generate a message identifying the identity and control capability level of a new control node from among the potential mesh control nodes identified in the tracked messages when the WTRU relinquishes service as the current control node by selecting as the new control node the potential mesh control node having a highest control capability level among the potential mesh control nodes identified in the tracked messages.

The WTRU's processor component is also preferably configured to track messages received identifying potential mesh control nodes when the WTRU is serving as the current control node in order of joining mesh communication by the potential mesh control nodes and is configured to generate a message identifying the identity and control capability level of a new control node from among the potential mesh control nodes identified in the tracked messages when the WTRU relinquishes service as the current control node by selecting the new control node based at least in part on the order of joining mesh communications by the potential mesh control nodes. The processor component may be further configured to generate, when the WTRU relinquishes service to a new control node, a message directed to the new control node identifying potential mesh control nodes previously tracked. Such a message if preferably generated in conjunction with generating a message identifying the identity and control capability level of the new control node from among the potential mesh control nodes identified in the tracked messages.

Where the WTRU has mesh network control capabilities of one of a hierarchy of control capability levels, the processor component may also be configured to generate a message to establish the WTRU itself as the current control node that includes data reflecting its own identity and control capability level in response to receipt of an Initiation message that reflects a current control node that has a control capability level lower than the control capability level of the WTRU. In such case, the processor component is preferably configured to generate a message, when serving as the control node, identifying the identity and control capability level of a new control node when the WTRU relinquishes service as the current control node in response to a received message to establish the new WTRU as the current control node that includes data reflecting that the new WTRU's identity and control capability level that is of a level higher than the control capability level of the WTRU.

In another embodiment, the WTRU's receiver component can also be configured to receive Initiation messages having data reflecting the identity, if any, of a current control node and a level of control capability of the current control node in connection with a mesh identity. The processor component is then preferably configured to generate Initiation messages that include data reflecting the identity, if any, of a current mesh control node and a level of control capability of the current control node in connection with a mesh identity.

The processor component is preferably further configured to generate a message establishing a control node when the WTRU is communicating in a first mesh that has a first control node that has a first control capability level in response to receipt of an Initiation message that reflects a second different mesh identity that has a second control node with a second control capability level. When the second mesh control node has a control capability level lower than the control capability level of the first mesh current control node, the message establishing a control node is directed to the second mesh control node and includes data reflecting the identity and control capability level of the first mesh control node and the first mesh identity. When the second mesh control node does not have a control capability level lower than the control capability level of the first mesh current control node, the message establishing a control node is directed to the first mesh control node and includes data reflecting the identity and control capability level of the second mesh control node and second mesh identity.

In such case, where the WTRU has mesh network control capabilities of one of a hierarchy of control capability levels, the processor component is configured to generate a message identifying the identity and control capability level of a new control node and a new mesh identity when the WTRU relinquishes service as the current control node in response to receiving a message establishing a control node reflecting the identity and higher control capability level of a control node of a different mesh. Such WTRU's may be also configured as an Access Point (AP) for a 802.11 wireless local area network (WLAN).

Other objects and advantages of the disclosed embodiments will be apparent to persons skilled in the art from the following description and accompanying drawings.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In accordance with one embodiment, WTRUs are configured with a peer-to-peer mode of operation, preferably, by being equipped with wireless local area network (WLAN) or wireless personal area network (WPAN) modems to exchange information directly between similarly equipped WTRUs. The WTRUs can have an integrated or installed WLAN or WPAN device, such as a 802.11 (WiFi) or Bluetooth compliant device, in order to communicate with each other. However, the proposed embodiments are applicable in any wireless system that implements a peer-to-peer mode of operation.

Figure 1A:
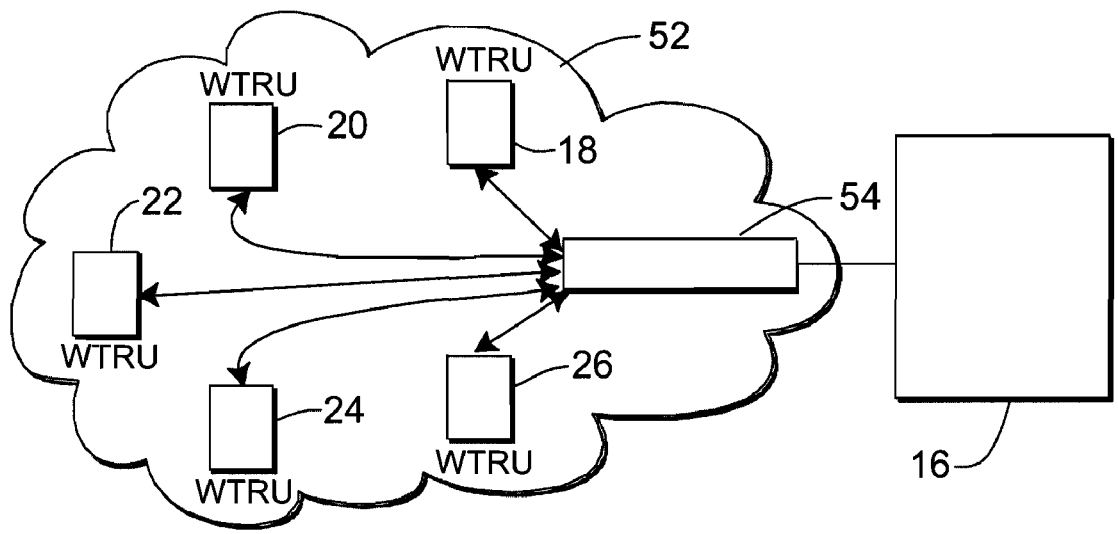
FIG. 1A is a diagram of a communications system operating in an infrastructure network mode of operation.
Figure 1B:
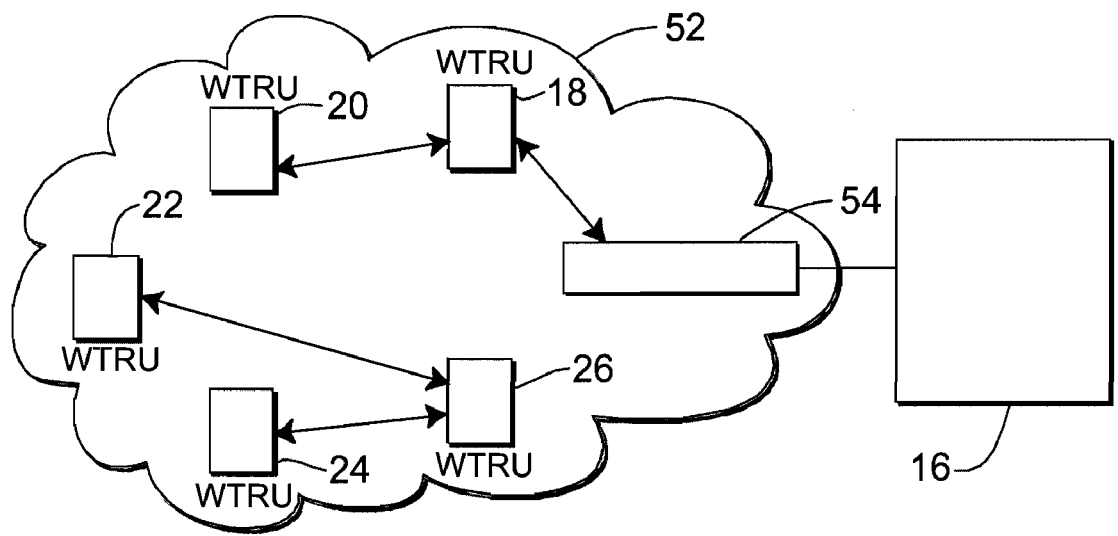
FIG. 1B is a diagram of a communications system operating in an ad hoc network mode of operation.
Figure 2:
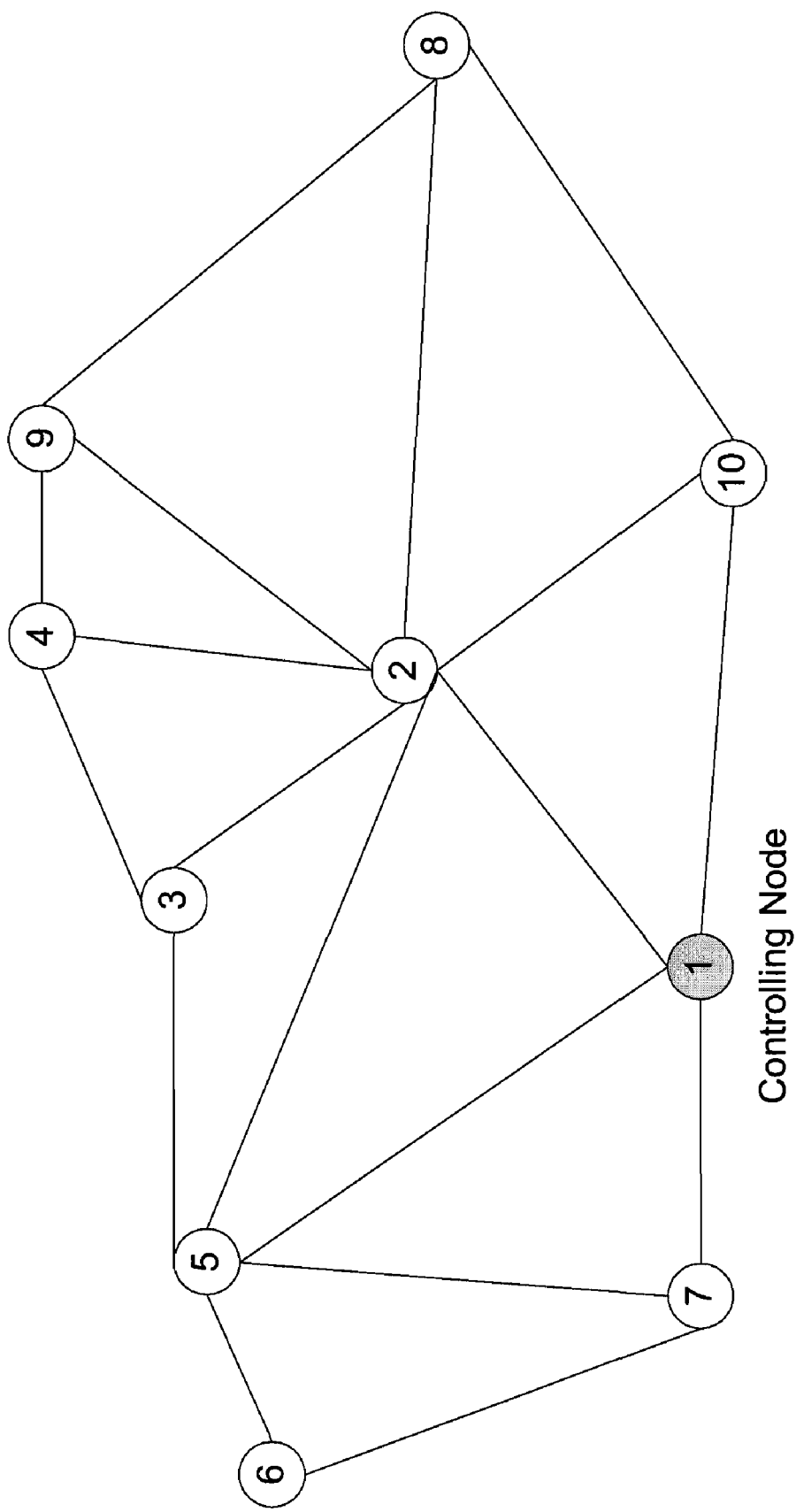
FIG. 2 is a diagram of a communications system operating in a controlled mesh network mode of operation in accordance with the teachings herein.

Referring to FIG. 2, a mesh network with Central Control is illustrated. As in WLAN, WPAN, WMAN, and other networks, an ad-hoc topology includes some nodes that can communicate one to each other directly (i.e. multipoint-to-multipoint).

Central Control of a mesh network is achieved when one node, for instance a network-initiating node, becomes the controlling entity (e.g. control node) in the network, provided that the initiating node has controlling capabilities. Thereafter each new joining node is informed of the identity of the control node. Alternatively, such as when the initiating node does not have controlling capabilities, the first joining node with controlling capabilities can become the control node, at least initially. Preferably, an initial mesh communication to any joining node includes either the identity of the control node or an indication of the absence of a control node. In the latter case, if the joining node has control node capabilities, it preferably becomes the control node and propagates a message to the other nodes identifying its status as the control node. Thereafter, new nodes joining the mesh are advised of this fact in initial communications.

In FIG. 2, the mesh network has nodes that are identified with a number according to the order in which they joined the network. As soon as there is one or more nodes in the network, the network-initiating node 1, serving as a control node for the network, can make a decision to perform a reconfiguration on the system parameters (e.g. power change, frequency channel change, etc.) according to predetermined or dynamic decision criteria. The reconfiguration information is then propagated to the other nodes 2, 5, 7, 10 directly in contact with the control node 1, which will relay the message to further nodes 3, 4, 6, 8, 9 in order to make the entire network aware of the decision.

In a similar manner to the propagation of information from the control node 1 forward, information can flow backwards to the control node. This allows for all nodes to communicate back to the control node information on system status, measurements, etc. as seen by each node.

Information transfer to and from the control node 1 can be done in several ways. One way is to include every single node's information in every message. This is highly inefficient. By using a system status variable in messaging, the system status variable can be updated every time a user adds its own system status to a message. A cost or health status variable can be used by the first node that has a value and a weight. As soon as the second node receives this message, it preferably averages its own status variable value with the existing one, updates the status value, updates the weight with the number of values averaged and then transmits the information again. As soon as a third node receives the message, it evaluates both the average value and the number of values averaged. Then it re-calculates the average by including its own data, updates both values again, and re-sends it and so on.

A sequence number or transaction ID can be included in an original message and kept over its lifespan in order to avoid looping, repeating or reprocessing the same message through the same node more than once.

Central Control can advantageously be provided for a Set of Point-to-Multipoint Networks acting as a Semi-mesh Network. Accordingly, the disclosed embodiments are applicable not only to a Mesh Network, but also to a series of BSs or APs that can listen to each other forming a set of point-to-multipoint networks. In this case the mobile WTRUs do not participate in cell-to-cell communications, but rather the APs and/or BSs exchange information between themselves. One AP is the controlling node and the other APs relay and exchange communication with it.

Central Control can also advantageously be provided in a Semi-mesh Network with Node Relay. A variation of the basic concept is to use WTRUs to relay information from one AP to another. Upon reception of a "please relay" message from an AP, a WTRU is preferably configured to repeat the transmission in order for the message to be received further away by other APs.

Central Control can also advantageously be provided with a Semi-mesh Network with an Infrastructure Backbone. This is a variation that relies on an Infrastructure Network, or any other way of communication than the one used for the APs to communicate to each other.

Mesh networks usually rely on independent and distributed algorithms to make decisions and perform actions that often give sub-optimal results. The disclosed embodiments allows for a central node to make optimal decisions and communicate them to other nodes in the network.

Preferably in implementing Central Control in Mesh and Semi-mesh Networks, an initial control node is designated, according to the capabilities of the nodes that join the mesh network. Preferably, the first node to join that has sufficient capabilities becomes the control node. This will be the initiating node where the initiating node has sufficient capabilities.

Central Control via a control node designation can be naturally applied to wireless networks such as WPAN (e.g. Bluetooth, 802.15), WLAN (e.g. 802.11), WMAN (e.g. 802.16), TDD (e.g. TD-CDMA, TD-SCDMA), et al., particularly for Radio Resource Management (RRM). One variation is to have a range of criteria standards so that an initiating node with a minimum set of capabilities is initially designated as the control node, but that node "gives up" control of the network to the first node joining with a higher set of capabilities within the hierarchy of established criteria standards. Accordingly, data identifying the control node that is sent to a joining node preferably includes an indication of the current control node's capabilities.

A WTRU that has control node capabilities preferably includes a receiver configured to receive an Initiation message upon joining a mesh network and an associated processor to evaluate the message to determine whether the WTRU possesses a higher order of control node capabilities than an identified control node. Where there is no current control node indicated in the received Initiation message or where the WTRU does possess a higher order of control node capabilities, a determination is preferably made by the WTRU to become the control node.

Implementation of the disclosed embodiments is readily accomplished by providing WTRUs that each have a receiver configured to receive mesh messages, a transmitter configured to send mesh messages and an associated processor configured to evaluate received messages and generate and transmit appropriate responsive messages. Each WTRU is preferably configured to transmit an appropriate Initiation message identifying the presence or absence of a control node and, when present the control node identification and capabilities information. The Initiation message may be generated as a response to a received Control Mesh Join Request message, may be used to initiate a new ad hoc network and/or may be periodically broadcast as a type of beacon signal message.

Each WTRU having control node capabilities preferably has a transmitter configured to send an appropriate Control Node Update message in reply to an Initiation message when the WTRU possesses a higher order of control node capabilities than is indicated in the Initiation message. In the absence of an existing control node being indicated in the received Initiation message, the WTRU has the higher order of control node capabilities by default. The WTRU's processor is then preferably configured to generate the Control Node Update message and include data identifying itself as the new control node and indicating its level of control node capabilities. Where the WTRU replaces a prior node as the control node, the WTRU preferably directs the Control Node Update message to the existing control node for propagation throughout the mesh network, either directly where the initiating message was received directly from the existing control node or indirectly where the initiating message was received from another node.

In order to avoid conflicts in Control Node Update messages generated by different joining WTRUs, a requirement for validation of a Control Node Update message by the existing control node can be imposed so that control is relinquished to the new node identified in the first received Control Node Update message by the existing control node. An alternative to validation is the generation of a Relinquish Control message that identifies the new control node being propagated by the existing control node. After validating a Control Node Update message or generating a Relinquish Control message, the node relinquishes control and may simply ignore subsequently received Control Node Update messages.

If a WTRU that has sent a Control Node Update message thereafter receives a validated Control Node Update (or Relinquish Control) message identifying a different WTRU as the new control node, the WTRU is preferably configured to process that message as an Initiation message to evaluate whether it has a higher set of capabilities than the new control node. If so, it generates a new Control Node Update message directed to the new control node.

To implement propagation, each WTRU is preferably configured to re-transmit messages which it receives from other WTRUs with which it is in contact, except where the WTRU has already retransmitted the same message which it may have previously received. As noted above, a message identification number or transaction ID, that may be in the form of a serial number or an indication of origination time and date, is preferably included in messages, such as Control Node Update messages to facilitate the WTRU's ability to avoid re-transmissions of the same message. Accordingly, the WTRU's processor is preferably configured to insert such information into messages which it generates and compare such information in received messages when making re-transmission decisions. Also the WTRU is preferably configured to modify the Initiation messages which it will transmit to a joining WTRU to include the most current control node information.

Additionally, nodes joining the mesh with acceptable control capabilities can be tracked based on level of capabilities, with entry into the mesh being a secondary tracking criteria. A WTRU with control node capabilities, is then preferably configured to transmit a Transfer Control message, when the WTRU has been acting as the control node and is preparing to disconnect from the mesh network, to a control node candidate WTRU selected based first on capability level and then on order of joining the mesh from among the tracked nodes. Preferably, the WTRU is configured such that when a control node candidate WTRU receives a Transfer Control message, it responds with a Control Node Update message identifying itself as the new control node. The WTRU can be configured such that when a Control Node Update message is not received in response to a Transfer Control message within a given time period, a new Transfer Control message to another WTRU is sent and the prior candidate control node is removed from the tracking list.

The Transfer Control message can include the identification of other nodes that are connected to the mesh that are being tracked as potential control node candidates. Alternatively this information can be sent in a dedicated message directed to the new control node by the node relinquishing control irrespective of which node initiated the change of control. WTRUs with control node capabilities are also preferably configured to send a message to the current control node when disconnecting from the mesh so that they are removed from the tracking list.

The WTRUs may be configured to send out Initiation messages in the event the control node is disconnected without a transfer of control to another node. A mesh control identification can also be provided in Initiation messages to indicate the creation of a new controlled mesh.

Additionally, the WTRUs can be configured such that when a WTRU communicating in a mesh controlled by one control node initiates communication with a WTRU in a mesh controlled by a different control node, one of the two control nodes is selected for control of the entire mesh. One way to accomplish this is to rely on the current control node information which each of the two nodes preferably possesses in accordance with the teachings herein.

The WTRUs are preferably configured such that a WTRU receiving an Initiation message from a WTRU in another mesh compares the capabilities of the control node of its existing mesh with the capabilities indicated in the Initiation message of the control node of the other mesh and generates an appropriate message reflecting the selection of either the existing mesh's control node or the other mesh's control node to the combined mesh. For example, where the existing control node capabilities exceed the capabilities of the other mesh's control node, the WTRU's processor is preferably configured to generate a Control Node update message in reply to the Initiation message which preferably includes data identifying the existing control node as the new control node of the other mesh. Otherwise, the WTRU generates a Control Node update message which it transmits via its existing mesh connections which includes data identifying the other mesh's control node as the new control node of the existing mesh.

Combinations of the above described methods are readily implemented. The disclosed embodiments are applicable to both wired and wireless networks. The foregoing description makes references to 802.11 type systems as an example only and not as a limitation. Other variations and modifications consistent with the disclosed embodiments will be recognized by those of ordinary skill in the art.

What is claimed is:

1. A wireless transmit/receive unit (WTRU) configured to conduct wireless communications with other WTRUs as nodes in a mesh type of network comprising:
   a receiver component configured to receive mesh messages including an Initiation message having data reflecting the identity of a current control node of a mesh network as an initial communication to join in mesh communications as a node of the mesh network;
   a processor component configured to generate mesh messages as a node of a mesh network that has a control node including Initiation messages that include data reflecting the identity of a current mesh control node; a transmitter component configured to transmit generated messages as a node of a mesh network that has a control node including Initiation messages generated by the processor component to enable other WTRUs to join in mesh communications as nodes of the mesh network;

the processor component is further configured to include a status value and an initial weight value in each generated mesh message and to modify each mesh message received for retransmission that has associated status and weight values by averaging the WTRU's status value with the received message's status value based on the received message's weight value and incrementing the received message's weight value to produce revised status and weight values; and the transmitter component is further configured to re-transmit mesh messages received from one WTRU to other WTRUs with which the WTRU is in mesh communication with the revised status and weight values.

2. The WTRU of claim 1 wherein:

the processor component is configured to include a message identifier in each generated mesh message and to track message identifiers included in received mesh messages; and the transmitter component is configured to re-transmit mesh messages received from one WTRU to other WTRUs with which the WTRU is in mesh communication on a condition that tracking reflects that the received message was not previously received.

3. The WTRU of claim 2 wherein:

the processor component includes a processor configured to include a message identifier in each generated mesh message and an associated memory configured to track message identifiers included in received mesh messages; and the transmitter component is configured to re-transmit mesh messages received from one WTRU to other WTRUs with which the WTRU is in mesh communication on a condition that tracking reflects that the received message was not previously received.

4. The WTRU of claim 1, where the WTRU does not have mesh network control capabilities, wherein the processor component is configured to generate Initiation messages that reflect no control node to initiate a mesh network with another WTRU or in response to receipt of an Initiation message to initiate a mesh network that reflects no control node, until receipt of a message identifying a control node.

5. The WTRU of claim 1, where the WTRU has mesh network control capabilities, wherein the processor component is configured to generate a message identifying the WTRU itself as the control node that includes data reflecting its own identity as the current mesh control node to initiate a mesh network with another WTRU or in response to receipt of an Initiation message to initiate a mesh network that reflects no current control node.

6. The WTRU of claim 1, where the WTRU has mesh network control capabilities, wherein:

the processor component is configured to generate a message directed to the current control node that includes data reflecting its own identity as a potential mesh control node in response to receipt of an Initiation message that reflects a current control node;

the processor component is configured to track messages received identifying potential mesh control nodes on a condition that the WTRU is serving as the current control node; and the processor component is configured to generate a message identifying a new control node from among the potential mesh control nodes identified in the tracked messages on a condition that the WTRU relinquishes service as the current control node.

7. The WTRU of claim 6 configured as an Access Point (AP) for a 802.11 wireless local area network (WLAN).

8. The WTRU of claim 1 wherein:

the receiver component is configured to receive Initiation messages having data reflecting the identity of a current control node and a level of control capability of the current control node; and the processor component is configured to generate the Initiation messages that include data reflecting the identity of a current control node to also include a level of control capability of the current control node.

9. The WTRU of claim 8 where the WTRU has mesh network control capabilities of one of a hierarchy of control capability levels wherein the processor component is configured to generate a message identifying the WTRU itself as the control node that includes data reflecting its own identity and control capability level to initiate a mesh network with another WTRU or in response to receipt of an Initiation message to initiate a mesh network that reflects no control node.

10. The WTRU of claim 8 where the WTRU has mesh network control capabilities of one of a hierarchy of control capability levels wherein:

the processor component is configured to generate a message directed to the current control node that includes data reflecting its own identity and control capability level as a potential mesh control node in response to receipt of an Initiation message that reflects a current control node;

the processor component is configured to track messages received identifying potential mesh control nodes on a condition that the WTRU is serving as the current control node; and the processor component is configured to generate a message identifying the identity and control capability level of a new control node from among the potential mesh control nodes identified in the tracked messages on a condition that the WTRU relinquishes service as the current control node.

11. The WTRU of claim 10 wherein the processor component is configured to generate a message identifying the identity and control capability level of a new control node from among the potential mesh control nodes identified in the tracked messages on a condition that the WTRU relinquishes service as the current control node by selecting as the new control node the potential mesh control node having a highest control capability level among the potential mesh control nodes identified in the tracked messages.

12. The WTRU of claim 10 wherein the processor component is configured to track messages received identifying potential mesh control nodes on a condition that the WTRU is serving as the current control node in order of joining mesh communication by the potential mesh control nodes and is configured to generate a message identifying the identity and control capability level of a new control node from among the potential mesh control nodes identified in the tracked messages on a condition that the WTRU relinquishes service as the current control node by selecting the new control node based at least in part on the order of joining mesh communications by the potential mesh control nodes.

13. The WTRU of claim 10 wherein the processor component is configured to generate a message directed to the new control node identifying potential mesh control nodes previously tracked in conjunction with generating a message identifying the identity and control capability level of a new control node from among the potential mesh control nodes identified in the tracked messages on a condition that the WTRU relinquishes service.

14. The WTRU of claim 8, where the WTRU has mesh network control capabilities of one of a hierarchy of control capability levels, wherein the processor component is configured to generate a message to establish the WTRU itself as the current control node that includes data reflecting its own identity and control capability level in response to receipt of an Initiation message that reflects a current control node that has a control capability level lower than the control capability level of the WTRU.

15. The WTRU of claim 14 wherein the processor component is configured to generate a message, on a condition that the WTRU is serving as the control node, identifying the identity and control capability level of a new control node on a condition that the WTRU relinquishes service as the current control node in response to a received message to establish the new WTRU as the current control node that includes data reflecting that the new WTRU's identity and control capability level that is of a level higher than the control capability level of the WTRU.

16. The WTRU of claim 8 wherein:
the receiver component is configured to receive Initiation messages having data reflecting the identity of a current control node and a level of control capability of the current control node in connection with a mesh identity; and
the processor component is configured to generate the Initiation messages that include data reflecting the identity of a current mesh control node to also include a level of control capability of the current control node in connection with a mesh identity.

17. The WTRU of claim 16 wherein the processor component is configured to generate a message establishing a control node on a condition that the WTRU is communicating in a first mesh network that has a first control node that has a first control capability level in response to receipt of an Initiation message that reflects a mesh identity of a second different mesh network that has a second control node with a second control capability level such that:
the message establishing a control node is directed to the second mesh control node and includes data reflecting the identity and control capability level of the first mesh control node and the mesh identity of the first mesh network on a condition that the second mesh control node has a control capability level lower than the control capability level of the first mesh current control node; and
the message establishing a control node is directed to the first mesh control node and includes data reflecting the identity and control capability level of the second mesh control node and second mesh identity on a condition that the second mesh control node does not have a control capability level lower than the control capability level of the first mesh current control node.

18. The WTRU of claim 17 where the WTRU has mesh network control capabilities of one of a hierarchy of control capability levels wherein the processor component is configured to generate a message identifying the identity and control capability level of a new control node and a new mesh identity on a condition that the WTRU relinquishes service as the current control node in response to receiving a message establishing a control node reflecting the identity and higher control capability level of a control node of a different mesh network.

19. The WTRU of claim 18 configured as an Access Point (AP) for a 802.11 wireless local area network (WLAN).

20. A method for a wireless transmit/receive unit (WTRU) to conduct wireless communications with other WTRUs in a mesh type of network comprising:
receiving mesh messages including an Initiation message having data reflecting the identity of a current control node of a mesh network as an initial communication to join in mesh communications as a node of the mesh network;
storing received mesh message information including current control node identity data;
generating and transmitting mesh messages as a node of the mesh network including an Initiation message to enable other WTRUs to join in mesh communications as nodes of the mesh network that includes data reflecting the identity of a current control node based on the stored control node identity data, wherein the generating mesh messages further comprises:
including a status value and an initial weight value in each generated mesh message;
modifying each mesh message received for retransmission that has associated status and weight values by averaging the WTRU's status value with the received message's status value based on the received message's weight value and incrementing the received message's weight value to produce revised status and weight values; and
the transmitting mesh messages includes re-transmitting mesh messages received from one WTRU to other WTRUs with which the WTRU is in mesh communication with the revised status and weight values.

21. The method of claim 20 wherein:
the generating mesh messages comprises including a message identifier in each generated mesh message;
the storing received mesh message information includes tracking message identifiers included in received mesh messages; and
the transmitting mesh messages includes re-transmitting mesh messages received from one WTRU to other WTRUs with which the WTRU is in mesh communication on a condition that tracking reflects that the received message was not previously received.

22. The method of claim 20 wherein:
the generating mesh messages comprises including a message identifier in each generated mesh message;
the storing received mesh message information includes tracking message identifiers included in received mesh messages; and
the transmitting mesh messages includes re-transmitting mesh messages received from one WTRU to other WTRUs with which the WTRU is in mesh communication on a condition that tracking reflects that the received message was not previously received.

23. The method of claim 20 for a WTRU that has mesh network control capabilities wherein:
the generating mesh messages includes generating a message, in response to receipt of an Initiation message that reflects a current control node, directed to the current control node that includes data reflecting its own identity as a potential mesh control node;
the storing received mesh message information includes tracking messages received identifying potential mesh control nodes on a condition that the WTRU is serving as the current control node; and
the generating mesh messages includes generating a message identifying a new control node from among the potential mesh control nodes identified in the tracked messages on a condition that the WTRU relinquishes service as the current control node.

24. The method of claim 23 performed by the WTRU that also includes the WTRU functioning as an Access Point (AP) for a 802.11 wireless local area network (WLAN).

25. The method of claim 20 wherein:
the receiving mesh messages includes receiving Initiation messages having data reflecting the identity of a current control node and a level of control capability of the current control node; and
the generating mesh messages includes generating Initiation messages that include data reflecting the identity of the current mesh control node and a level of control capability of the current control node.

26. The method of claim 25 for a WTRU that has mesh network control capabilities of one of a hierarchy of control capability levels wherein:
the generating mesh messages includes generating a message directed to the current control node that includes data reflecting its own identity and control capability level as a potential mesh control node in response to receipt of an Initiation message that reflects a current control node;
the storing received mesh message information includes tracking messages received identifying potential mesh control nodes on a condition that the WTRU is serving as the current control node; and
the generating mesh messages includes generating a message identifying the identity and control capability level of a new control node from among the potential mesh control nodes identified in the tracked messages on a condition that the WTRU relinquishes service as the current control node.

27. The method of claim 26 wherein the generating mesh messages includes generating a message identifying the identity and control capability level of a new control node from among the potential mesh control nodes identified in the tracked messages on a condition that the WTRU relinquishes service as the current control node by selecting as the new control node the potential mesh control node having a highest control capability level among the potential mesh control nodes identified in the tracked messages.

28. The method of claim 26 wherein the storing received mesh message information includes tracking messages received identifying potential mesh control nodes on a condition that the WTRU is serving as the current control node in order of joining mesh communication by the potential mesh control nodes and the generating mesh messages includes generating a message identifying the identity and control capability level of a new control node from among the potential mesh control nodes identified in the tracked messages on a condition that the WTRU relinquishes service as the current control node by selecting the new control node based at least in part on the order of joining mesh communications by the potential mesh control nodes.

29. The method of claim 26 wherein the generating mesh messages includes generating a message directed to the new control node identifying potential mesh control nodes previously tracked in conjunction with generating a message identifying the identity and control capability level of a new control node from among the potential mesh control nodes identified in the tracked messages on a condition that the WTRU relinquishes service.

30. The method of claim 25 for a WTRU that has mesh network control capabilities of one of a hierarchy of control capability levels wherein the generating mesh messages includes generating a message to establish the WTRU itself as the current control node that includes data reflecting its own identity and control capability level in response to receipt of an Initiation message that reflects a current control node that has a control capability level lower than the control capability level of the WTRU.

31. The method of claim 30 the generating mesh messages includes generating a message, on a condition that the WTRI is serving as the control node, identifying the identity and control capability level of a new control node on a condition that the WTRU relinquishes service as the current control node in response to a received message to establish the new WTRU as the current control node that includes data reflecting that the new WTRU's identity and control capability level that is of a level higher than the control capability level of the WTRU.

32. The method of claim 25 wherein:
the receiving mesh messages includes receiving Initiation messages having data reflecting the identity of the current control node and a level of control capability of the current control node in connection with a mesh identity; and
the generating mesh messages includes generating Initiation messages that include data reflecting the identity of the current mesh control node and a level of control capability of the current control node in connection with a mesh identity.

33. The method of claim 32 wherein the generating mesh messages includes generating a message establishing a control node on a condition that the WTRU is communicating in a first mesh network that has a first control node that has a first control capability level in response to receipt of an Initiation message that reflects a mesh identity of a second different mesh network that has a second control node with a second control capability level such that:
the message establishing a control node is directed to the second mesh control node and includes data reflecting the identity and control capability level of the first mesh control node and the first mesh identity on a condition that the second mesh control node has a control capability level lower than the control capability level of the first mesh current control node; and
the message establishing a control node is directed to the first mesh control node and includes data reflecting the identity and control capability level of the second mesh control node and second mesh identity on a condition that the second mesh control node does not have a control capability level lower than the control capability level of the first mesh current control node.

34. The method of claim 33 for a WTRU that has mesh network control capabilities of one of a hierarchy of control capability levels wherein the generating mesh messages includes generating a message identifying the identity and control capability level of a new control node and a new mesh identity on a condition that the WTRU relinquishes service as the current control node in response to receiving a message establishing a control node reflecting the identity and higher control capability level of a control node of a different mesh.

35. The method of claim 34 performed by the WTRU that also includes the WTRU functioning as an Access Point (AP) for a 802.11 wireless local area network (WLAN).

* * * * *